(12) United States Patent
Brockmann et al.

(10) Patent No.: US 6,348,687 B1
(45) Date of Patent: Feb. 19, 2002

(54) AERODYNAMIC BEAM GENERATOR FOR LARGE PARTICLES

(75) Inventors: John E. Brockmann; John R. Torczynski; Ronald C. Dykhuizen; Richard A. Neiser; Mark F. Smith, all of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/394,185

(22) Filed: Sep. 10, 1999

(51) Int. Cl.[7] .................................................. H01J 41/04
(52) U.S. Cl. ........................ 250/251; 250/288; 436/173
(58) Field of Search ................................ 250/251, 288, 250/281, 282; 436/173, 183

(56) References Cited

U.S. PATENT DOCUMENTS

| | | | | | |
|---|---|---|---|---|---|
| 5,270,542 | A | * | 12/1993 | McMurry et al. | 250/288 |
| 5,565,677 | A | * | 10/1996 | Wexler et al. | 250/251 |
| 5,681,752 | A | * | 10/1997 | Prather | 250/288 |
| 5,998,215 | A | * | 12/1999 | Prather et al. | 250/288 |

\* cited by examiner

*Primary Examiner*—Kiet T. Nguyen
(74) *Attorney, Agent, or Firm*—Brian W. Dodson

(57) ABSTRACT

A new type of aerodynamic particle beam generator is disclosed. This generator produces a tightly focused beam of large material particles at velocities ranging from a few feet per second to supersonic speeds, depending on the exact configuration and operating conditions. Such generators are of particular interest for use in additive fabrication techniques.

17 Claims, 7 Drawing Sheets

AERODYNAMIC BEAM GENERATOR FOR LARGE PARTICLES

This invention was made with Government support under Contract DE-AC04-94DP85000 awarded by the U.S. Department of Energy. The Government has certain rights in the invention.

BACKGROUND

The present invention relates generally to material fabrication, and more specifically to generating a tightly focused beam of large material particles as are useful for additive fabrication techniques.

Aerodynamic focusing of large particles is a technology which can be applied to various direct fabrication technologies, including direct laser fabrication (LENS), hot spray, and cold spray processing. The LENS process uses a laser to melt a small puddle on a working surface. Growth material in the form of large (>10 $\mu$m) particles is then added to the puddle, some of which melts therein and becomes incorporated into the component being grown. In cold spray processing, rapid deposition of a wide range of materials occurs when large particles are delivered against a growth surface at velocities in the 400–1000 m/sec regime. Hot spray processing passes the particles through a laser, which melts the particles before the hit the growth surface. All of the above processes are capable of providing special material properties to the final component.

A primary difficulty which appears in all known direct fabrication technologies is to direct the material being added to the precise point where it is needed, thereby obtaining a finely detailed product. Unfortunately, current methods of supplying powders to the growth surface produce broad and unfocused patterns of powder distribution, whereas the desired distribution is narrow (e.g., <1 mm), and focused to a specific region.

The most common approach toward obtaining a spray of particles is to pass a carrier gas in which a series of particles is entrained through a simple expansion nozzle. The result is a wide and diverging plume of relatively slow particles. This plume can be narrowed by removing the outer regions of the plume with a particle diverter (e.g., a cone-shaped aperture with a hole at the apex), but this approach reduces the flux of particles to the extent that a fabrication process based thereon is impracticably slow.

There is therefore a need for a source of beams of large solid particles with velocity vectors accurately directed, or focused, along a single direction. Useful patterns of particles can be line-like (one-dimensional) or plane-like (two-dimensional) in the direction of motion.

SUMMARY OF THE INVENTION

The present invention is a device to generate tightly focused beams of large (1 $\mu$m<<L<<100 $\mu$m) material particles. These particles can be generated in quantity, and with velocities ranging from a few feet per second to supersonic velocities with appropriate post-focusing acceleration. Such particle beams are of considerable importance for additive fabrication techniques, where the particles are directed precisely against the spot on a workpiece where they are to be added, whereupon an energetic influence (laser heating, heating due to impact deformation, etc.) causes the particle to merge with the structure of the workpiece. A single line-like beam source can deliver on the order of a cubic centimeter of particles per minute to a growing component, a value considerably in excess of those characteristic of present direct additive fabrication techniques with the further benefit of minimal overspray resulting in much higher efficiency in material usage.

BRIEF DESCRIPTION OF THE FIGURES

FIG. 5a shows the use of a sheath gas injector, and FIG. 5b shows the use of a porous flow tube.

FIG. 6a shows the use of a smaller downstream flow tube. FIG. 6b shows the use of decreasing flow tube sizes. FIG. 6c shows the use of a downstream porous flow tube to inject additional carrier gas in the annulus where flow reconnection occurs.

DETAILED DESCRIPTION

Applicants have developed an aerodynamic particle beam generator which addresses the aforementioned need for a highly focused source of large solid particles. An aerodynamic particle beam generator accepts as input a stream of a carrying gas which has the large solid particles entrained in its flow. The generator then manipulates the flow streamlines of the carrying gas so as to concentrate the particles and their velocity vectors along a symmetry axis of the generator structure. The result is a beam of particles having an overall diameter less than a millimeter in size, and a divergence of a few milliradians.

Figure 1A:
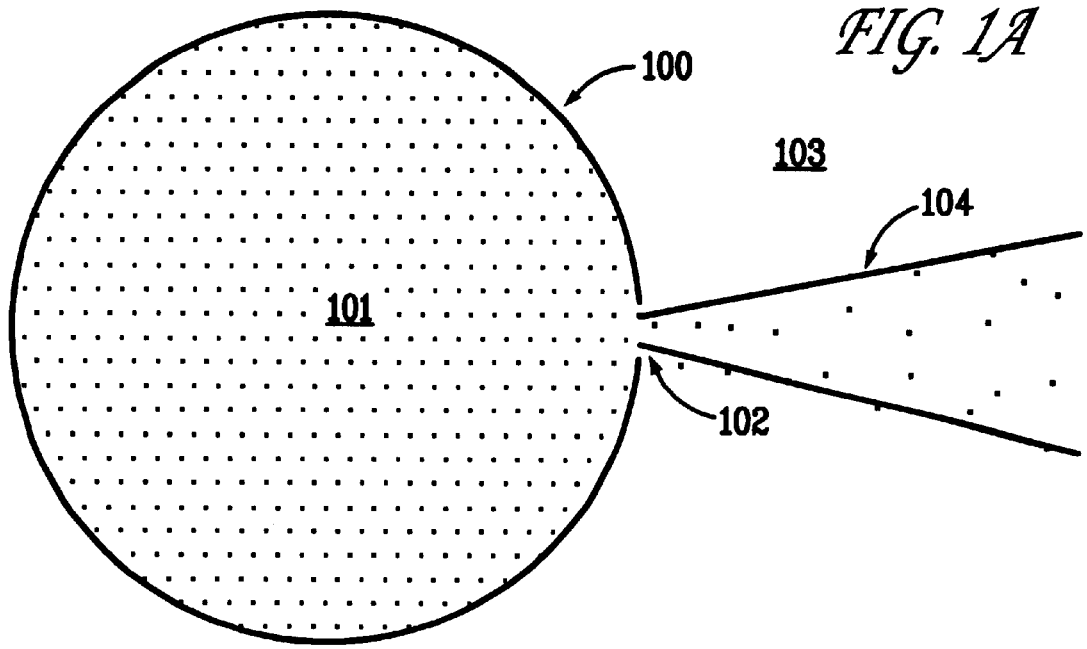
FIGS. 1a and 1b show a schematic illustration of the operation of prior art devices.

Aerodynamic effects have been previously used to generate point sources of entrained particles, as shown in FIG. 1a. Such prior art devices comprise a reservoir 100 which is filled with a mixture 101 of small particles suspended and entrained in a carrier gas. (The particles are small [generally<<1 m] because the gas velocity is essentially zero within the reservoir, meaning that the particles depend on Brownian motion to remain suspended for long periods.) The wall of the reservoir has a small orifice 102 which opens into an external environment 103 with lower pressure. A jet of particles 104 extends into the environment.

Figure 1B:
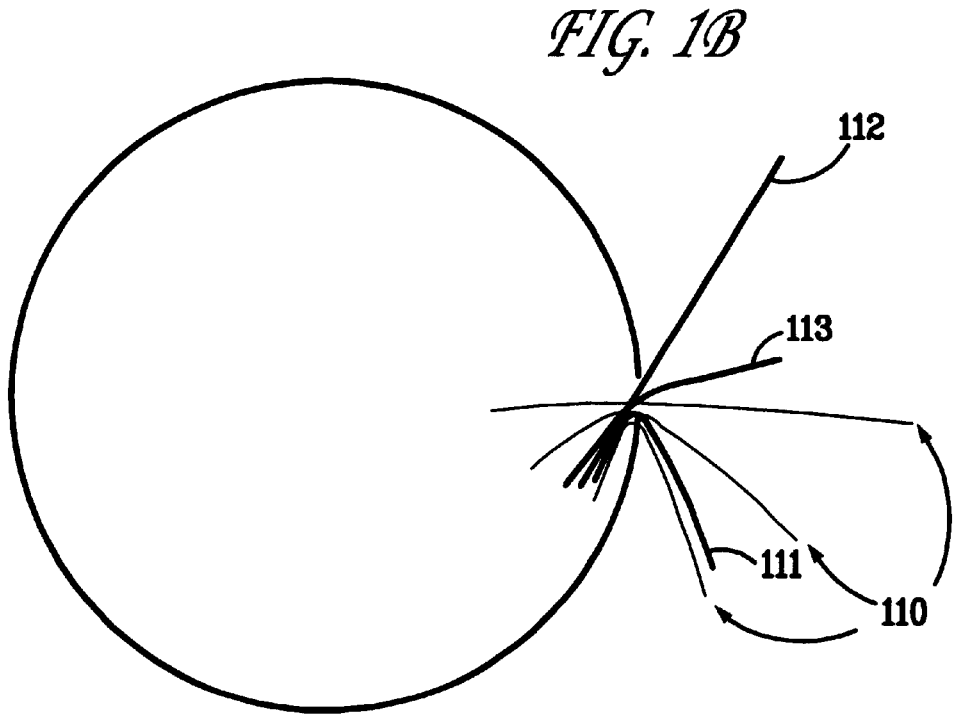
Figure 2:
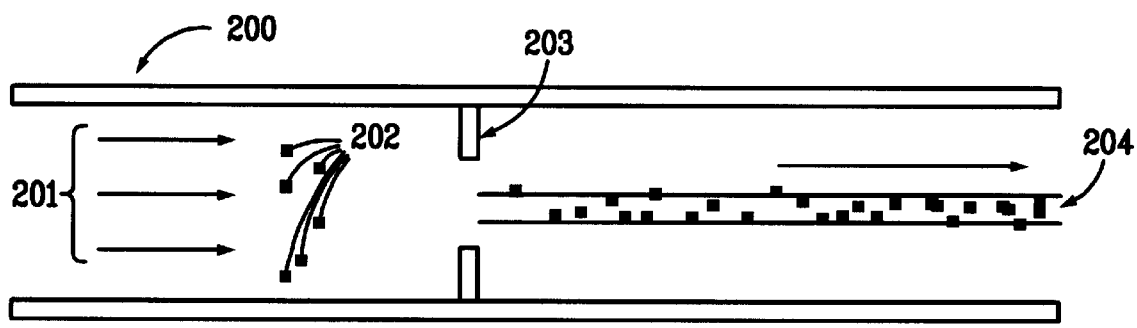
FIG. 2 shows a schematic illustration of another prior art device.
Figure 3:
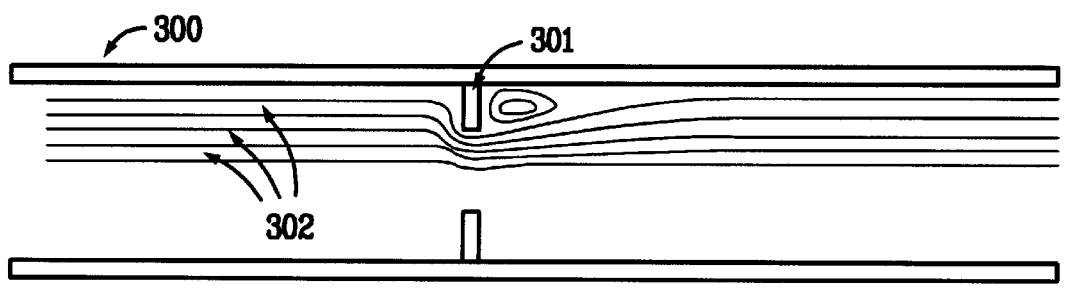
FIG. 3 shows a schematic illustration of the carrier gas flow streamlines of the prior art device of FIG. 2 in operation.
Figure 4:
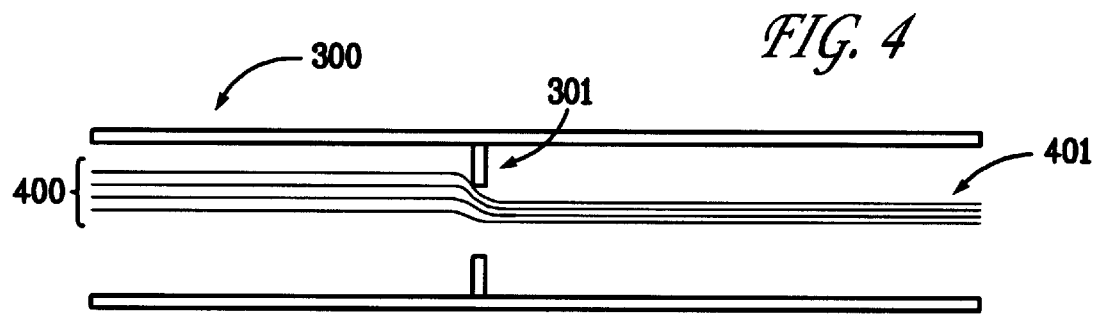
FIG. 4 shows a schematic illustration of the particle trajectories of the prior art device of FIG. 2 in operation.

The operation of such prior art devices is illustrated in FIG. 1b, which shows the carrier gas streamlines 110 and some particle paths. The carrier gas streamlines point toward the orifice inside the reservoir, with the flow velocity slowly increasing as the orifice is approached. In the orifice per se the streamlines curve through parallel orientation to the axis of the orifice, experiencing very large accelerations, then continuing to curve in the reverse orientation as the gas escapes the orifice.

Figure 5A:
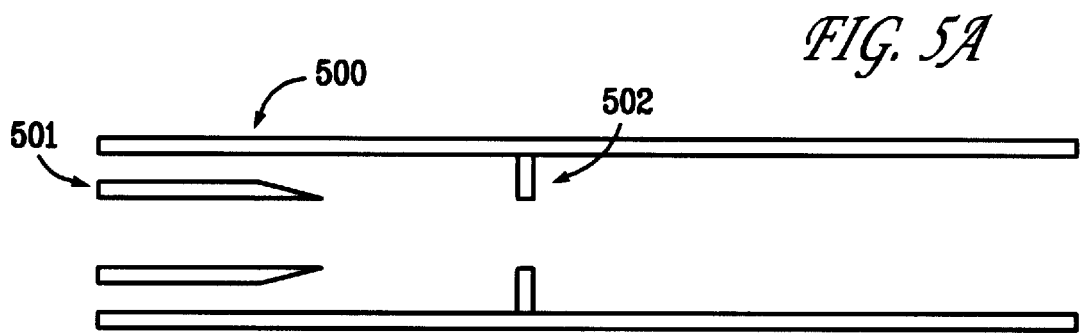
FIGS. 5a and 5b shows two approaches toward putting an annular sheath of gas around the carrier gas/particle mixture to be converted into a particle beam.

Extremely small particles 111 will follow the streamlines of the carrier gas, and thus will not experience significant focusing. Large particles 112 will not be significantly affected by the flow of gas through the orifice, and hence will not be focused by the prior art device. Particles of intermediate size 113 have sufficient inertia that they will not follow the streamlines of the carrier gas in the regime where those streamlines are rapidly varying, and as a result can take on output trajectories which are more closely oriented with the orifice axis than are their original streamlines. The result is a narrower spray, but not a true focusing of the particles in a single direction. Such prior art devices are useful for manipulation of, e.g., small clusters to enable spectroscopic examination, but fail to address the needs of direct fabrication in either particle size or angular width of the particle trajectories.

Another prior art approach, shown in FIG. 2, used flowing particles in a gas stream flowing in a tube and in-line flow constrictions to aerodynamically focus small [generally<<1 m] particles along the central line of the tube. This configuration is useful for the manipulation of small particles, but is not capable of forming a low divergence beam of large particles.

Applicant's invention incorporates several improvements to the prior art device of FIG. 2, resulting in the ability to provide dense beams of particles having masses many orders of magnitude larger than those which could previously be formed.

In order to focus larger particles, higher flow velocities are necessary for two reasons. The first is to minimize the effects of the gravitational settling of the larger particles and the second is to produce particle Stokes numbers on the order one. The particle Stokes number in this application is defined as the particle relaxation time, $\tau$, times the gas velocity, U, divided by the constriction diameter, d.

The use of larger flow velocities requires fundamental changes in the structure of the device. These changes include providing means to restrict particles immediately upstream of the first focusing element from impacting on the upstream face of the element, and developing means to reduce the reattachment length for flow taking place downstream of the focusing element.

Examine what happens when the prior art apparatus is used with the larger gas flow velocities required by the use of large particles. The apparatus comprises a flow tube 200, in which a carrier gas 201 is flowing at a rate which is similar in magnitude (~10%) to the streamline velocities which are generated when the carrier gas passes through axial constriction 203. The carrier gas again contains suspended or entrained particles 202, but in this case the larger flow velocity means that large particles can be used.

In the instant invention, the magnitude of the streamline velocities does not change dramatically as the flow passes through the axial constriction 203. (This is in comparison to the prior art devices, in which the flow velocity changes by many orders of magnitude in the region of the orifice.) As a result, the accelerations involved in following the various carrier gas streamlines are bounded in a fairly narrow range.

However, large particles originating in the outer annular region of the device will fail to pass through the orifice, owing to the high streamline accelerations in this regime and the inertia of the particles. These particles strike the leftmost surface of axial constriction 203, and enter greatly modified trajectories, which prevent them from being directed along the central axis. As a result, a well-defined particle beam 204 cannot be formed.

The operation of a typical prior art device is shown in FIG. 3, which illustrates the carrier gas streamlines, and in FIG. 4, which illustrates the particle trajectories.

In FIG. 3, the carrier gas streamlines 302 are seen to remain nearly parallel to the central axis of the flow tube 300 until they closely approach the axial constrictor 301, whereupon they deflect toward the central axis so that the flow can penetrate the axial constrictor. In doing so, the flow velocity also increases.

On passing through the constrictor, the streamlines again diverge, but a significant distance must be traversed before the flow reattaches to the wall of the flow tube. As a result, the streamlines near the central axis of the flow tube remain essentially parallel to that axis for a long distance. Recall that until reconnection occurs, the device does not produce a tightly directed beam, even though focusing effects might appear. In addition, the effectiveness of multiple constriction devices requires that flow reconnection to the tube wall takes place before the next axial constrictor is encountered.

The particle trajectories 400 in the above beam generator for particles initially near the central axis of the flow tube appear in FIG. 4. The fate of those particles further from the central axis has already been revealed—they strike the surface of the axial constrictor and act to defocus the particle beam. It is clear that the particles which begin near the central axis experience strong concentration along the central axis of the flow tube, and that the trajectories of such particles in the particle beam 401 are almost perfectly aligned with the central axis.

Clearly this degree of concentration and focusing into a parallel beam will not occur for arbitrary particle sizes and gas flow rates. Rough guidelines are that the Reynolds number associated with flow through the axial constrictor be less than about 1000, that the ratio of the diameter of the flow tube to the diameter of the aperture in the axial constrictor be on the order of 2 or 3, and that the Stokes number associated with the entrained particles be in the range of about 1 to about 100. Routine experimentation will allow these guidelines to be exceeded in many cases.

It was mentioned above that the particles whose initial trajectories within the flow tube were far from the central axis behaved in a different manner. At some distance from the central axis, the flow streamlines change direction and accelerate inward too rapidly for particles, which if they were closer to the central axis would focus, to follow. As a result, these particles cross the streamlines, impact the axial constrictor, and scatter into undesirable locations. When they do pass through the constrictor, it is generally in a manner which distorts or destroys the fine focused beam, thereby hindering the intended application.

There is a critical radius for a given generator of the type described herein, where if a particle is entrained in the axial flow at an initial position within the critical radius of the central axis of the generator, the particle will be focused and concentrated onto the central axis, whereas if the initial position is outside that critical radius, it will impact the axial constrictor and degrade the operation of the generator.

Applicants have found that such degradation can be avoided in a particle beam generator according to the present invention by including new structures which serve to confine the particles to within this critical radius. In one approach, a system is added to inject an annular sheath of gas, coflowing with the carrier gas which entrains the particles, around an inner particle stream.

This can be accomplished in two primary ways, as illustrated in FIG. 5. FIG. 5a shows the use of a sheath gas injector 501 positioned within the flow tube 500 to form the annular sheath. The annular region between the flow tube and the sheath gas injector is supplied with sheath gas from a sheath gas source (not illustrated). Similarly, the interior of the sheath gas injector is supplied with a carrier gas/particle mixture from a particle source (not illustrated).

The end of the sheath gas injector is far enough from the axial constrictor 502 that it does not significantly affect the flow pattern thereabout, but is close enough that the sheath gas does not have an opportunity to intermix with the particle stream. The annular region surrounding the sheath gas injector is filled with axially flowing sheath gas, said gas flowing at substantially the same rate as is the carrier gas/particle mixture which flows within the sheath gas injector. The particles are thus restricted to flow within the critical radius, and hence are essentially entirely concentrated onto the immediate vicinity of the central axis.

Figure 5B:
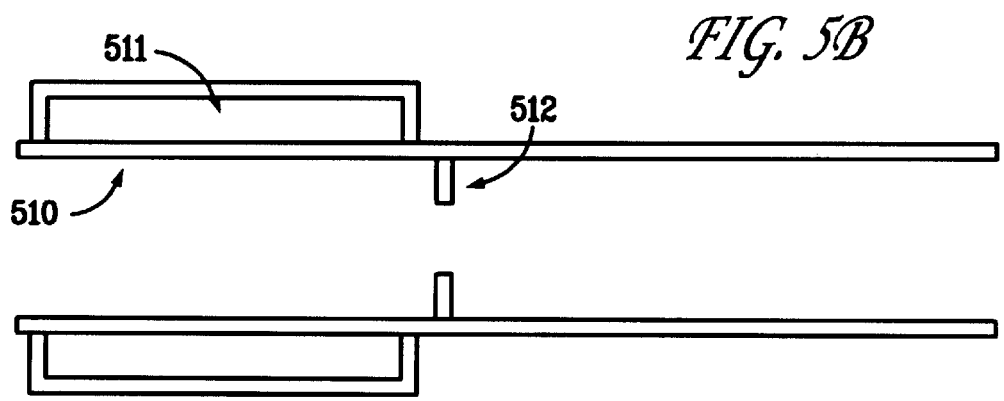
Figure 6A:
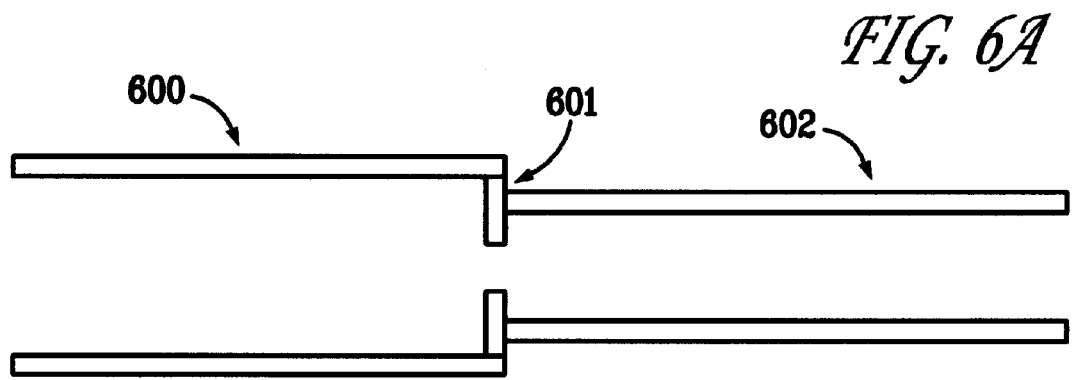
FIGS. 6a, 6b and 6c show three approaches toward obtaining shorter wall reconnection distances after the flow passes through an axial constrictor.
Figure 6B:
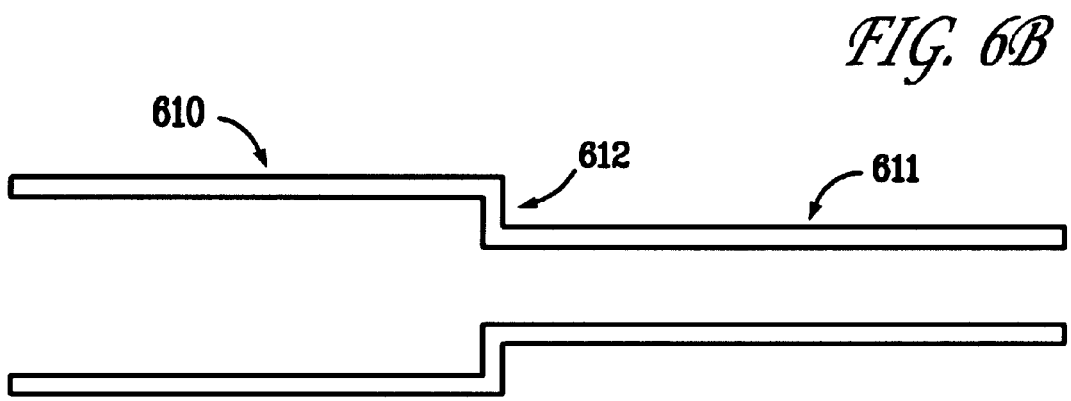
Figure 6C:
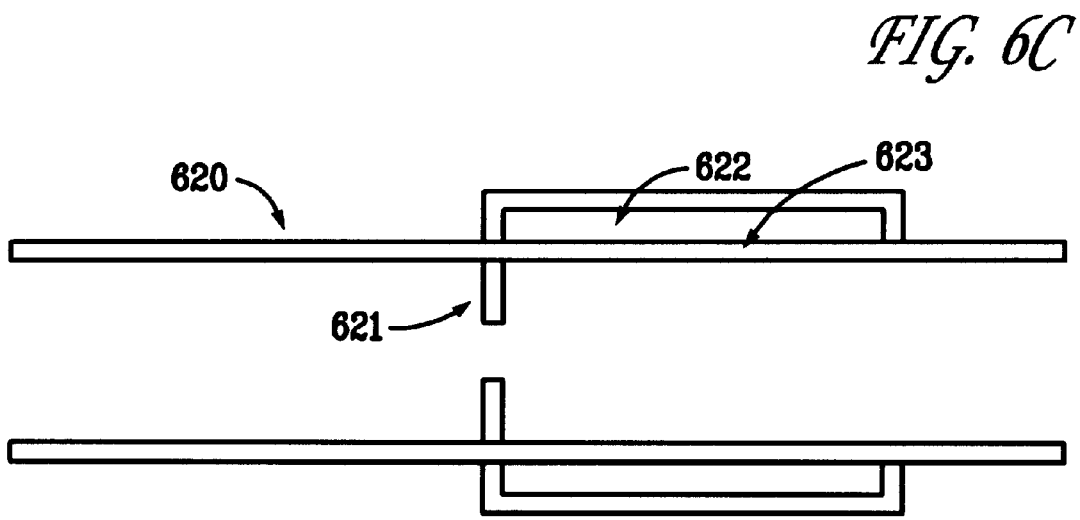
Figure 7:
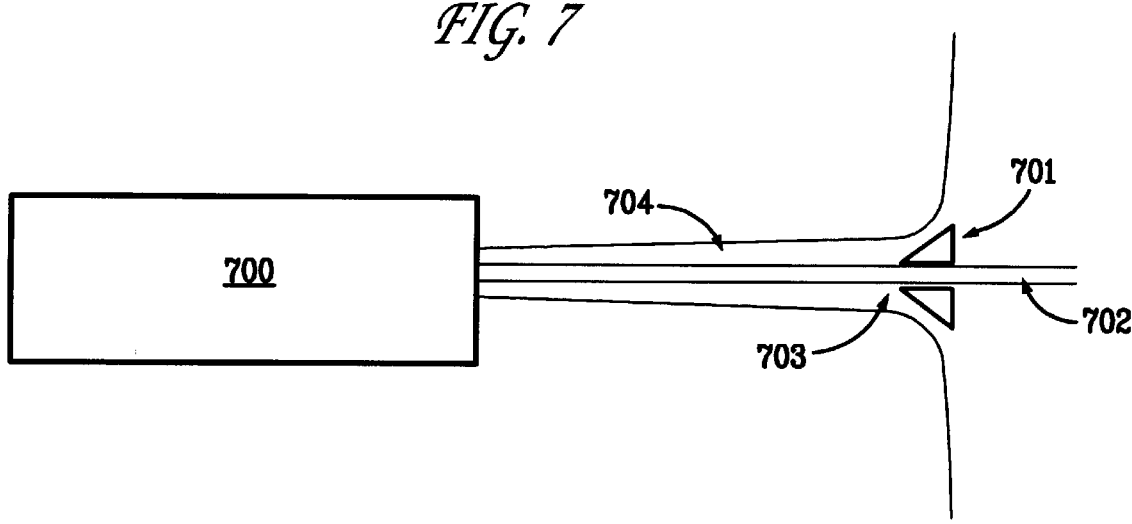
FIG. 7 shows the use of a conical flow stripper to isolate the particle beam from the bulk of the comoving carrier gas.
Figure 8:
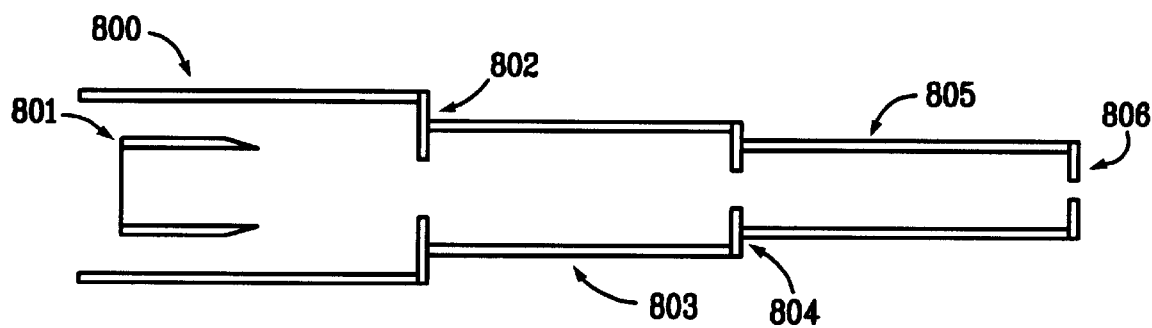
FIG. 8 shows a multiple-stage aerodynamic particle beam generator according to the instant invention.
Figure 9:
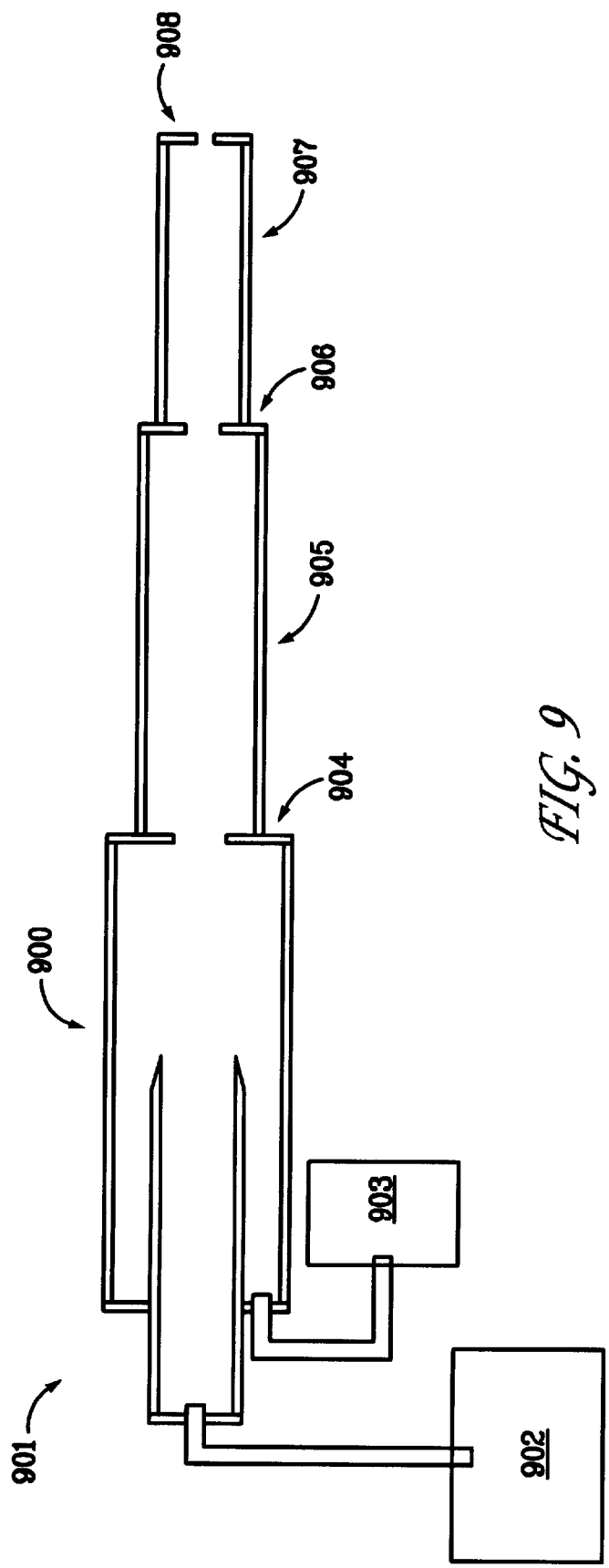
FIG. 9 shows a multiple-stage aerodynamic particle beam generator built and tested by Applicants.

FIG. 5b shows an alternate approach toward generation of an annular sheath gas layer. Here gradual injection of the sheath gas through a porous flow tube 510 from a surrounding sheath gas reservoir 511 concentrates the carrier gas/particle mixture, which initially fills the porous flow tube, to fit within the critical radius before interacting with axial constrictor 512. These two approaches to formation of an annular sheath gas layer can be combined. Such combination is particularly useful when a sheath must flow stabily over a large distance before interacting with the axial constrictor.

In FIGS. 3 and 4 the flow streamlines and particle trajectories, respectively, were illustrated for an aerodynamic particle beam generator. It was observed that reattachment of the gas flow pattern to the wall of the flow tube had a significant influence on the ultimate dispersion of the particle beam. Essentially, such reattachment prevents the flow pattern from significant radial divergence, and hence the particles remain tightly concentrated about the central axis. Also, in a multiple element system, the flow must be reattached to the wall prior to encountering the next focusing element so that the converging streamlines will be generated to provide aerodynamic focusing. Focusing elements placed too close together will produce a situation in which the flow from the upstream element will pass directly through the down stream element without divergence and a recirculating flow will be established in the annular region.

It can easily take some 15–20 flow tube diameters for the flow to reconnect in the dynamic regime of operation of these devices, which can result in unusably long beam generators. This distance can be greatly reduced by attaching a reduced diameter flow tube 602 downstream of the axial constrictor 601 as shown in FIG. 6*a*. (Recall that the prior art devices had flow tubes with equal internal diameters throughout the apparatus.) The amount that the diameter of flow tube 602 can be reduced from that of flow tube 600 without adversely affecting the flow pattern which generates the beam depends on the operating parameters of the device, but is generally in the neighborhood of a 15–30% reduction in diameter.

FIG. 6*b* shows a somewhat simpler approach to the problem, in which expansion after the constricting apertures is not allowed. Instead, the generator takes the shape of a series of successively smaller flow tubes. Thus, first flow tube 610 is attached to second flow tube 611, whose inside diameter is smaller than that of first flow tube 610. The union 612 between the first and second flow tubes serves the function of the axial constrictor.

Another approach to providing more rapid flow reconnection is shown in FIG. 6*c*. A porous section 623 is added to the wall of the flow tube 620 downstream of the axial constrictor 621, and gas from annular reservoir 622 is injected therethrough. This places a new sheath of gas around the particle stream, and returns the flow dynamics in the flow tube to essentially pure axial flow more rapidly than if the extra gas were not so injected.

At this point, the invention produces a narrow beam of rather dense particles surrounded by an annular sheath of rapidly flowing gas. In many applications, however, the presence of the annular sheath of gas can disrupt the desired properties of the particle beam. For example, in direct fabrication applications, disruption of the particle beam by the non-axial currents which arise when the sheath of gas interacts with the object being grown can seriously degrade the ultimate feature size which can be grown.

It is therefore useful to provide means to strip the annular gas flow away from the particle beam without disturbing the particle beam. This can be accomplished in many ways. Perhaps the easiest is shown in FIG. 7, where a conical flow stripper 701 is positioned downstream of the beam generator 700. Such a flow stripper works by allowing passage of the particle beam 702 through an apical hole 703, whereas the bulk of the sheath gas 704 is deflected by the flow stripper's conical surface into directions away from the particle beam.

The previous discussion shows that several-fold constriction about the central axis of the generator of a flow of heavy particles can be achieved by using the present invention with a single stage of flow constriction. (Constriction refers to the reduction in particle beam diameter.) Although useful, this degree of constriction is insufficient for many applications.

Applicants have found that multiple axial constrictors can be used to provide for large degrees of constriction, with constriction values in excess of 10 being easily obtained. Such a multiple concentrator beam generator is shown in FIG. 8. Here first flow tube 800 and sheath gas injector 801 produce the initial axial flow of gas, the central portion of which has large particles entrained. The flow interacts with first axial constrictor 802, resulting in a particle flow constriction of about 3 times when the flow has reconnected to the wall of the second flow tube 803, which has a smaller diameter to reduce the flow reconnection length. A second axial concentrator 804 is placed within the second flow tube 803 at a point after the flow has become reattached. A third focusing segment consisting of third flow tube 805 and third axial concentrator 806 completes the generator. Typically, the ratio between the diameter of the upstream flow tube and the axial constrictor is constant, and about equal to 2–3, but neither condition is required for optimum performance.

A three-stage aerodynamic particle beam generator according to the present invention which was built and tested by Applicants is shown together with important dimensions in FIG. 9. First flow tube 900 and concentric sheath gas injector 901 are respectively connected to a particle source 902 of carrier gas/powder entrained mixture, and to a sheath source 903 of sheath gas. The sheath gas and the carrier gas can, but generally need not, be the same gas. The relative rate of flow of the two gases is chosen so that the linear flow rate is essentially the same, thereby minimizing the mutual disruption of the two streams of gas when they begin to interact downstream of injector 901.

The inside diameter of first flow tube 900 is 0.210", and first axial constrictor 904, with an aperture diameter of 0.120", is affixed at the downstream end of the first flow tube, roughly 1 inch or more downstream of the end of injector 901. Second flow tube 905, with an inside diameter of 0.180" and a length of 2.0", is attached to the downstream side of first axial constrictor 904. This length. is sufficient for the flow to reconnect to the walls of the second flow tube because of the reduction in inside diameter relative to the first flow tube.

Similarly, second axial constrictor 906, which has an aperture diameter of 0.090", is attached to the end of second flow tube 905. On the downstream end is further attached third flow tube 907, which has an inside diameter of 0.135" and a length of 2..0", again long enough to obtain flow reconnection. The final axial constrictor 908 has an aperture diameter of 0.070" (1.78 mm).

Figure 10:
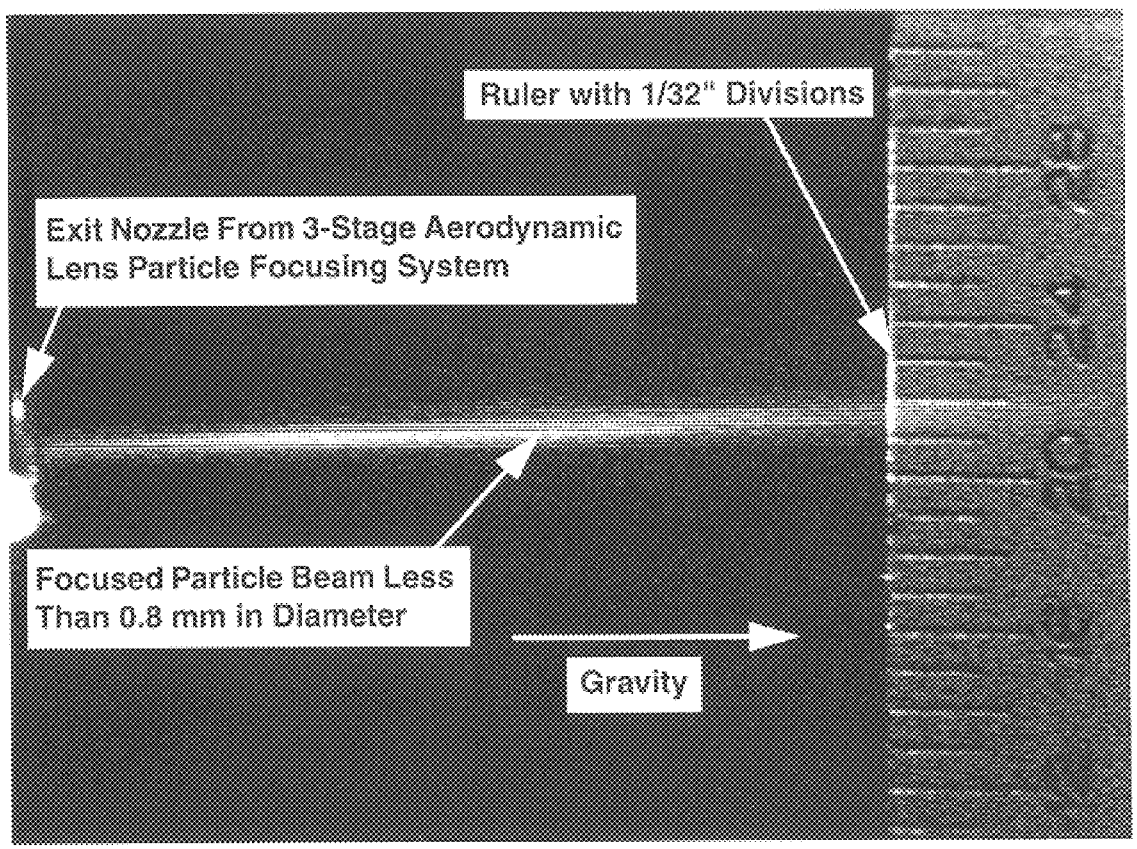
FIG. 10 shows a photograph of the generator of FIG. 9 in operation.

Applicants tested the above particle beam generator in generating tight beams of a high density of 15 $\mu$m aluminum particles entrained in a 0.7 liter per minute flow of nitrogen gas. FIG. 10 shows the region of the final orifice from the side, with a well-defined and nearly divergence-free beam of aluminum particles emerging from the generator. The diameter of the beam of aluminum particles is 0.8 millimeter. Applicants believe that such a generator, when properly optimized, can generate a dense beam of particles on the order of 50 $\mu$m in diameter and with an angular dispersion well below 10 milliradian.

What density of particles can be delivered by such a generator? The primary requirement is that the particles be sufficiently separated that both direct and transport gas mediated particle-particle interactions are negligible. A reasonable condition for this goal is that particles in the beam be separated by at lest 10 times their own diameter. If a tight beam of 30 $\mu$m particles is considered, there is only room for one particle at a time to exit the generator. If an intermediate particle velocity of 2 m/sec is chosen, then the particle separation of 300 $\mu$m corresponds to a particle flow of about $6\times10^3$ per second, or about 0.3 cubic centimeters per hour. As this is the material delivery rate for what is likely to be the slowest generator, the rate is clearly large enough for practical application. The tested device delivered 0.6 cubic centimeters per hour of 15 mm aluminum particles. With experimental development higher particle delivery rates should be achievable.

The particle velocities at the generator output depend on the operating conditions, but are typically well below sonic velocity. Higher velocities are useful for many application, such as the cold spray direct fabrication techniques described earlier. Supersonic velocities can be generated by coupling the output of a generator 1000 to a properly designed nozzle 1001, as shown in FIG. 10. One example of a suitable nozzle would be a deLaval nozzle of the type used in rocket engines.

Consistently through the above discussion the assumption has been made, explicitly or implicitly, that the generator is rotationally symmetric about a central axis. Such a generator produces a quasi-one-dimensional beam. However, this assumption need not be made. For example, if the generator is symmetric in reflection about a central plane, it will emit a sheet of particles, rather than a linear beam.

The examples and implementations described above are intended to illustrate various aspects of the present invention, not to limit the scope thereof. The scope of the invention is set by the claims interpreted in view of the specification.

What is claimed is:

1. An aerodynamic particle beam generator, comprising:

a) a source of particles suspended in a transport gas;

b) a first flow tube into which the suspension of particles in flowing gas is directed;

c) an axial constrictor through which the gas flowing out of the first flow tube is directed; and, d) a second flow tube, downstream of the axial constrictor, and having a smaller internal cross-sectional area than that of the first flow tube; and e) a gas sheath generator which forms a sheath of gas around the particles suspended in a transport gas, before the combined flow interacts with the axial constrictor.

2. The generator of claim 1, further comprising a flow stripper.

3. The generator of claim 1, further comprising a focuser having an input flow tube and multiple constrictor stages, each constrictor stage comprising an axial constrictor and an output flow tube, the internal cross-sectional areas of the flow tubes decreasing in the direction of the transport gas flow.

4. The generator of claim 3, further comprising a gas sheath generator which forms a sheath of gas around the particles suspended in a transport gas, before the combined flow interacts with the first axial constrictor.

5. The generator of claim 4, wherein the generator further comprises an output nozzle.

6. The generator of claim 5, wherein the output nozzle interacts with the combined flow so as to produce supersonic particle velocities.

7. The generator of claim 5, wherein the output nozzle is a De Laval nozzle.

8. The generator of claim 4, wherein said gas sheath generator comprises a sheath gas injector.

9. The generator of claim 4, wherein said gas sheath generator comprises a porous flow tube.

10. The generator of claim 1, wherein the generator further comprises an output nozzle.

11. The generator of claim 10, wherein the output nozzle interacts with the particles suspended in flowing gas so as to produce supersonic particle velocities.

12. The generator of claim 10, wherein the output nozzle is a De Laval nozzle.

13. The generator of claim 1, further comprising an output nozzle.

14. The generator of claim 13, wherein the output nozzle interacts with the combined flow so as to produce supersonic particle velocities.

15. The generator of claim 13, wherein the output nozzle is a De Laval nozzle.

16. The generator of claim 1, wherein said gas sheath generator comprises a sheath gas injector.

17. The generator of claim 1, wherein said gas sheath generator comprises a porous flow tube.

* * * * *